United States Patent
Rumsey et al.

(10) Patent No.: US 6,219,082 B1
(45) Date of Patent: Apr. 17, 2001

(54) PRINTER RASTER OUTPUT SCANNING SYSTEM WITH DIFFERENTIAL SCREW MICRON LEVEL BOW CORRECTION

(75) Inventors: Karen M. Rumsey, Cary, NC (US); Clifford L. George, Geneseo, NY (US); Antonio L. Williams, Rochester, NY (US); Susan E. F. Dunn, Mohegan Lake, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/458,150

(22) Filed: Dec. 9, 1999

(51) Int. Cl.[7] .............................. B41J 15/14; B41J 27/00; G02B 7/182
(52) U.S. Cl. ......................... 347/242; 347/257; 359/849; 359/873
(58) Field of Search ................................... 347/241, 243, 347/256, 257, 259, 260, 242; 359/822, 823, 838, 849, 865, 873; 356/301

(56) References Cited

U.S. PATENT DOCUMENTS 5,084,715 * 1/1992 Mama ................................... 347/259
5,596,404 * 1/1997 Beck et al. ............................ 356/301

* cited by examiner

Primary Examiner—Thinh Nguyen
Assistant Examiner—Hai C. Pham

(57) ABSTRACT

An apparatus and method of making very small curvature modifications of the reflective surface of a mirror in a printer raster scanning system for bow correction of the scanning beam by gripping edges of the mirror to bend it with a gripping system and applying a very small movement thereto by gross rotation of screw shaft of a differential screw system operatively connected to that gripping system. The screw shaft has two separate fine screw thread patterns of slightly different screw pitches causing gross rotation of the screw shaft to only move the mirror gripping system and its engaged portion of the mirror by micro-meter amounts by automatically subtracting the two slightly different screw pitches from one another, thus providing very small, easily controlled, deformation of the mirror plane for bow correction by non-critical gross rotation of the screw shaft.

1 Claim, 5 Drawing Sheets

PRINTER RASTER OUTPUT SCANNING SYSTEM WITH DIFFERENTIAL SCREW MICRON LEVEL BOW CORRECTION

Disclosed in the embodiments herein is an improved, simple, low cost, system for micron level adjustment of a mirror surface. In particular, for bow correction of a printer ROS scanning beam linearity on the printer photoreceptor by a very small mirror surface deformation adjustment in the photoreceptor raster scanning output imaging system, utilizing a simple differential screw system in which two slightly different screw pitches of a differential screw subtract from one another to convert a gross or macro mechanical rotation of the differential screw into a micron level movement for a micron level mirror surface curvature change. Thus, solving a major problem in that widely practiced commercial technology (publicly better known as "laser printers") with a very simple and inexpensive, yet effective, solution.

That is, this is a low cost and simple to use fix for the well-known "bowing" problem in laser imaging, that is, observable non-linearity of the laser scan line on the photoreceptor surface. As shown in the disclosed embodiments, this bowing is hereby correctable by, but is not limited to being caused by, the reflectance surface of the post-polygon fold mirror in a ROS system, since bowing may have various ROS system sources. The disclosed system allows very fine, very precise, alignment changes in a ROS mirror surface curvature or flatness without requiring delicate and expensive adjustment equipment.

As disclosed in the specific embodiment, the bow correction system may employ a special differential screw member with two coaxial, but separate, and very slightly different pitch, screw thread surfaces respectively screw coupled to different elements of the system. Rotation of the differential screw member effectively subtracts one screw pitch movement from the other in this system, thus applying an adjustment movement of only the very small difference between the two screw pitches to the bowing deflection of the mirror.

As disclosed in the specific embodiment, this simple differential screw in combination with a yoke or other mirror holding system can make fine mechanical adjustments in the flatness or deformation of a fold mirror (or other mirror) in a ROS system substantially along the optical path to correct for residual scan line bow, or other errors.

Bow matching to the 5 to ten micron level is particularly important in color applications, such as those in which multiple beam ROS sweep or scanning beam patterns have to all be precisely registered relative to one another on the same photoreceptor or on plural (tandem) photoreceptors in the same color printer. The human eye is particularly sensitive to color print registration errors of composite color images.

By way of background, it is known to provide screw adjustments, with normal, single pitch, screws, of the angular position of the reflective plane of mirrors, such as in the initial manufacturing alignment of scanning mirror systems in xerographic light-lens copiers.

Raster output scanner (ROS) systems per se are well know, extensively patented, and need not be re-described herein.

A specific feature of the specific embodiment(s) disclosed herein is to provide in a printer with a raster scanning system for image scanning a photoreceptor surface with scan lines, which scan lines have a small undesired non-linear bow, and which raster scanning system has an optical path with at least one mirror therein, the improvement for at least partially compensating for said bow comprising: a bow compensation system for very slightly deforming the initial plane of said mirror in a direction to partially correct said bowing of said scan lines, said bowing compensation system including a mirror gripping system for gripping said mirror, and a differential screw system engaging said mirror gripping system, said differential screw system having a screw shaft with first and second separate fine screw thread patterns having slightly different screw pitches, one of which screw thread patterns operatively engages said mirror gripping system so that rotation of said screw shaft moves said mirror gripping system and its engaged portion of said mirror by the difference between said slightly different screw pitches to provide a very small deformation of said mirror by a rotation of said screw shaft.

Further specific features disclosed herein, individually or in combination, include those further comprising a frame member holding said mirror in a fixed position at a position on said mirror different from said mirror gripping system, wherein said frame member has a first threaded hole engaging said first screw thread pattern of said screw shaft, and wherein said mirror gripping system has a second threaded hole coaxial with said first threaded hole, said second threaded hole engaging said second screw thread pattern of said screw shaft; and/or wherein a method of making very small curvature modifications of the reflective surface of a mirror comprising gripping at least one portion of the mirror with a gripping system, and applying a very small movement to said gripping system by gross rotation of screw shaft of a differential screw system operatively connected to said gripping system, wherein said screw shaft has two separate fine screw thread patterns of slightly different screw pitches, whereby said gross rotation of said screw shaft moves said mirror gripping system and its engaged portion of said mirror by automatically subtracting said two slightly different screw pitches from one another to provide a very small deformation of said mirror by said gross rotation of said screw shaft.

As to specific components of the subject apparatus, or alternatives, it will be appreciated that, as is normally the case, some such components are known per se in other apparatus or applications which may be additionally or alternatively used herein, including those from art cited herein. All references cited in this specification, and their references, are incorporated by reference herein where appropriate for appropriate teachings of additional or alternative details, features, and/or technical background. What is well known to those skilled in the art need not be described here.

Various of the above-mentioned and further features and advantages will be apparent from the specific apparatus and its operation described in the examples below, and the claims. Thus, the present invention will be better understood from this description of specific embodiments, including the drawing figures (approximately to scale) wherein:

Figure 1:
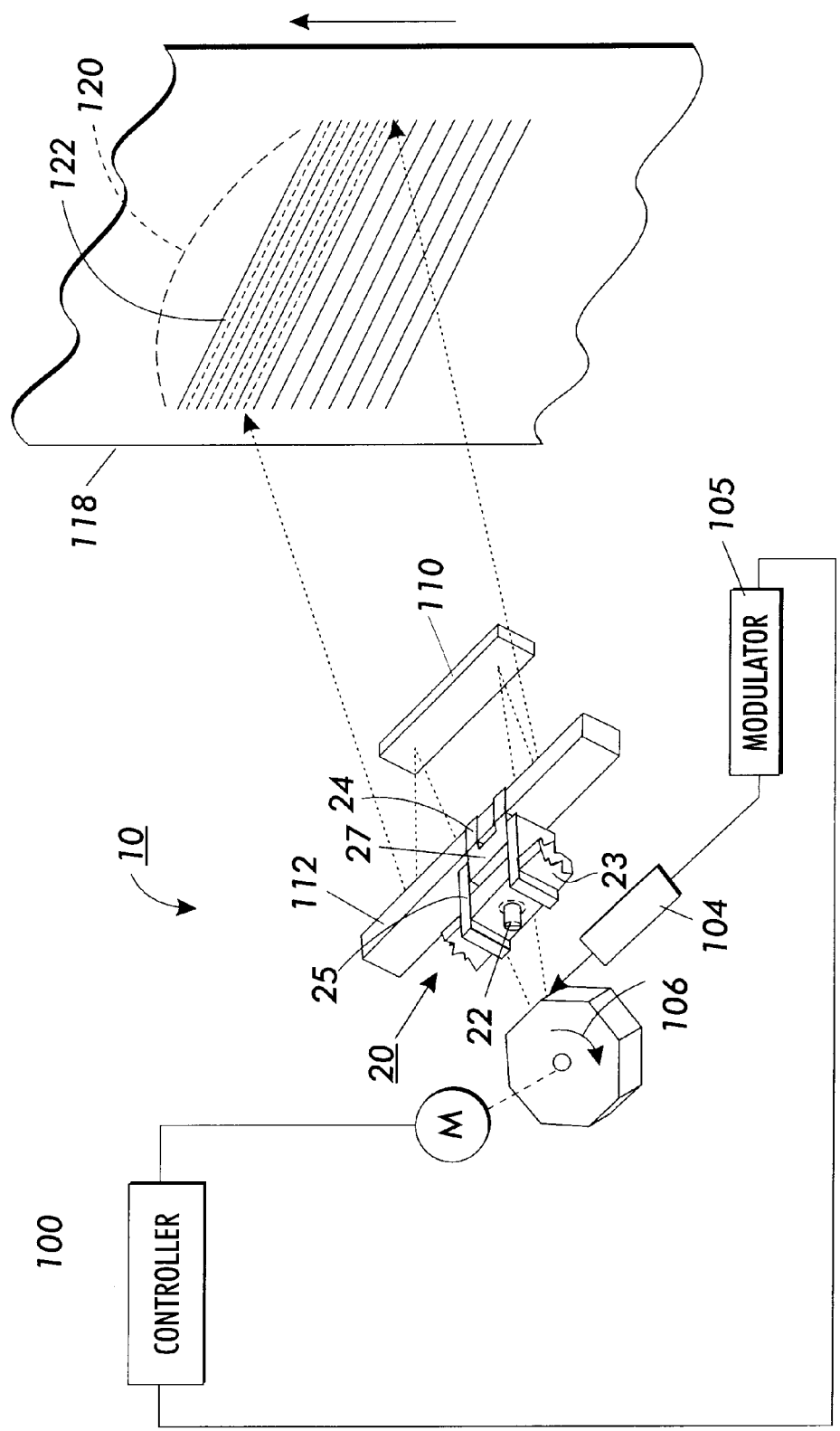
FIG. 1 is a schematic perspective view, partially broken away, of one exemplary ROS system embodiment embodying one example of the subject bow correction system, for small controlled deformation of the second fold mirror of the ROS in this example.
Figure 2:
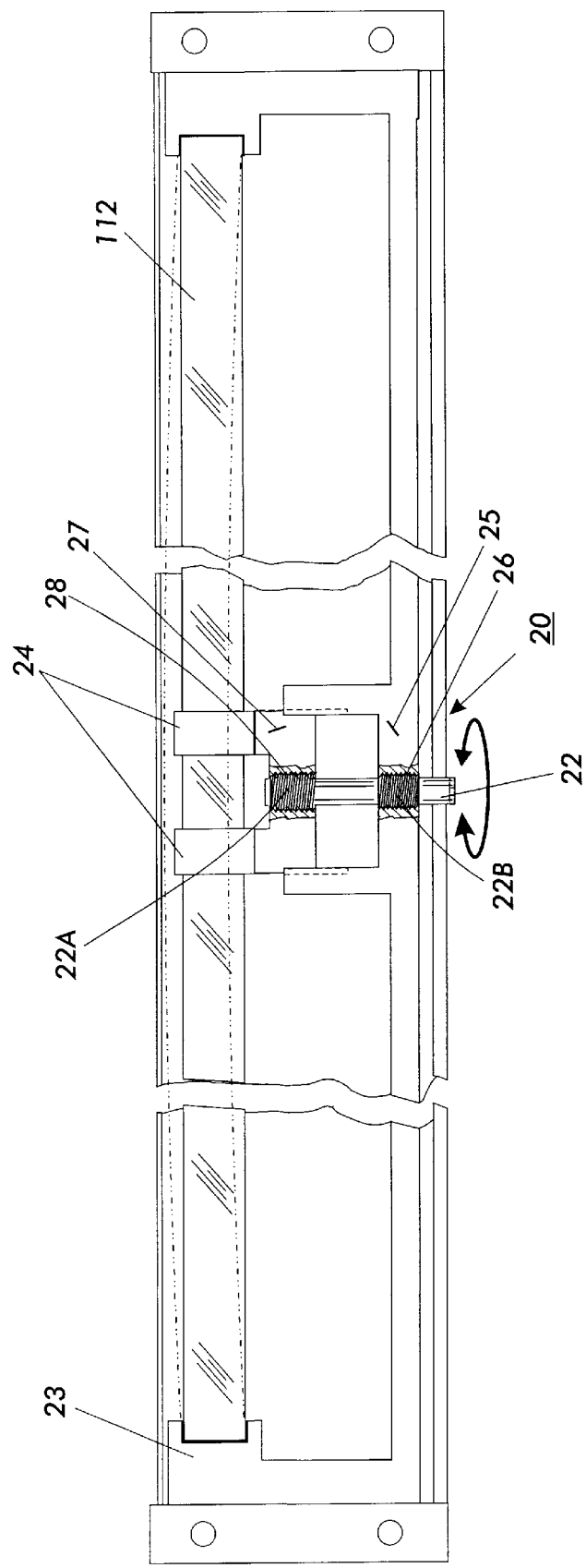
FIG. 2 is a top view of the exemplary bow correction system of FIG. 1.
Figure 3:
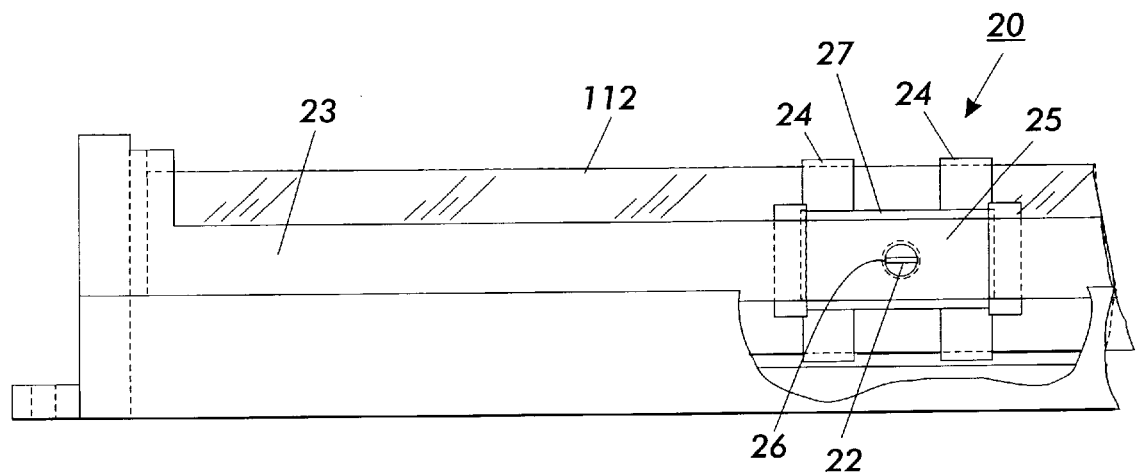
FIG. 3 is a side view (partially broken off) of the exemplary bow correction system of FIGS. 1 and 2.
Figure 4:
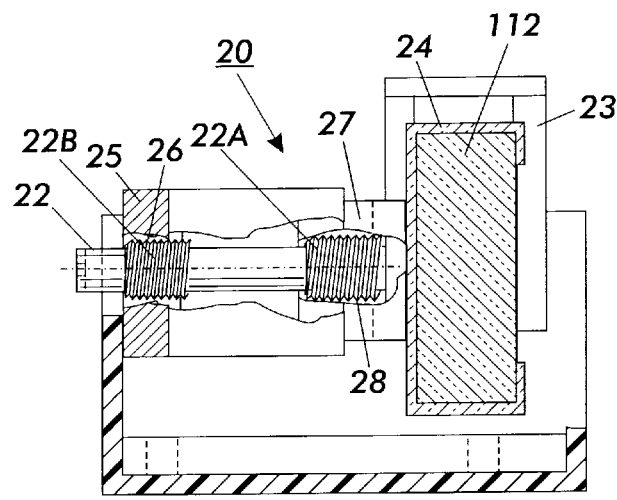
FIG. 4 is a central cross-sectional end view of the exemplary bow correction system of FIGS. 1–3.

Referring first to FIG. 1, there is shown one example of a printer raster output scanner (ROS) system 10 with one example of the subject bow correction system 20 (which system 20 is illustrated in enlarged detail in FIGS. 2–4). This is an otherwise conventional ROS 10 for a printer. As will be well known to those skilled in this art, in this or other such well known ROS systems, a laser or lasers 104 generates one or more light beams which are modulated by a modulator 105 and swept by a rotating polygon faceted mirror 106 driven by a motor M, both under control of a controller 100 with an electronic image input. That scanning beam or beams may be reflected by a first mirror 110 to a second or final (and elongated) fold mirror 112, which reflects the scanning beams onto the surface of a moving photoreceptor 118, to image that photoreceptor 118 with closely spaced scan lines 122. The scan lines 122 expose the photoreceptor 118 in image pixel patterns defined by the modulator 105, to form developable and printable images in a well known manner.

However, as will be further discussed, such ROS systems tend to have undesired bowing in the scan lines 122. One example of such an uncorrected bow 120 of the scan line 122 is illustrated (greatly exaggerated) in the dashed line 120 in FIG. 1.

As noted above, especially in a digital color copier or printer that requires more than one such ROS imager subsystem, or a multibeam ROS, pixel placement accuracy is extremely important to achieve registration specifications. For the desired colors to be developed correctly in a color machine with multiple beam imagers, the respective related latent images of different colors being exposed on the photoreceptor (PR) by different scanning beams must be positioned within microns. In virtually every ROS imager design, the image produced has bow, defined as curvature of the scan line in the process direction from one end of the scan line to the other end. In a ROS with a plano-mirror (with no bow correction), the bow variation from one ROS imager to another ROS imager can be as high as 50 um or greater, and this is unacceptable for registration in a color machine with multiple imagers. The bow varies greatly from ROS to ROS due to optical and mechanical tolerances; therefore, an individual ROS bow correction technique is important to achieve registration. That is, an individual adjustment of an optical element of the ROS system. The ROS final fold mirror was determined to be the most desirable optical element compensator to correct for bow in ROS systems with two fold mirrors. A mechanical holder and adjustment mechanism for that mirror, as described herein, was designed to provide this bow correction adjustment, as shown in this embodiment example.

Thus, referring to FIGS. 2–4 in particular (as well as FIG. 1), they show an exemplary such bow correction system and mechanism 20. It will be apparent that various different constructions other than the example 20 disclosed below may be used to achieve the same function.

In this bow correction system example 20, the post-polygon second fold mirror 112 is placed inside a steel mirror mounting frame or carriage 23, which holds this elongated mirror at its opposite ends (broken away in FIG. 1 for illustrative clarity). A steel yoke or C-clip 24 grips the approximate center of this elongated mirror 112, contacting this mirror there at two locations (the top and bottom of the mirror). A first steel block 25 with a tapped and threaded hole 26 of one fine threading (e.g., M4.5×0.75 mm threading) is attached to the frame or carriage 23. A second steel block 27 with a second tapped and threaded hole 28 of another, slightly different pitch, fine threading (e.g., M5×0.80 mm threading) of the same direction, is attached to the C-clip 24. A differential screw 22 is inserted through the threaded hole 26 in the first (carriage) block 25 and also into the threaded hole 28 in the second (C-clip) block 27. One end of the differential screw 22 has the same diameter and thread size as the hole 26 in the first block 25, and the other end of the screw 20 has the same diameter and thread size as the hole 28 in second block 27.

Once this system 20 is assembled, whenever the differential screw 22 is turned clockwise the mirror 112 is pulled toward the carriage by only about 50 um for each single screw turn. The mirror 112 thus bends very slightly in the fast scan plane (the X-plane), and the curvature of the mirror then resembles a parabolic surface. This small corrective curvature of the mirror 112 is illustrated (with large exaggeration) by the dashed line position thereof in FIG. 2. The amount of applied mirror bend is proportional to the amount of bow correction required at the image plane.

As illustrated and described, this is because the special differential screw member 22 has two coaxial, but separate, and very slightly different pitch, screw thread surfaces 22A and 22B. These two slightly different pitch screw threads 22A and 22B effectively subtract from one another as the screw member 22 is rotated. Rotation of the screw member 22 thus moves its screw-connecting blocks 25 and 27 in opposite directions but by very small distances. Thus, applying an adjustment movement of only the very small difference between the two screw pitches to the bowing deflection of the connecting mirror 112. With the disclosed differential screw system, very small mirror curvature adjustments of only, for example, plus or minus 5 or 10 um, can be easily made by simple gross screw turn adjustments. A screwdriver rotation of an entire turn of the differential screw 22 can provide as little as 50 um of axial movement in this example.

To simplify the bow correction adjustment process, the bow correction mechanism 20 may desirably be initially assembled under tension with the mirror curved or bent by the maximum desired correction amount (e.g., about 150 um of initial mirror deformation from planar), which in this example equates to about 3 turns of the differential screw 22. This tightens up and removes all "slack" or "backlash" in the system 20. Then, for the bow correction adjustment, the differential screw may be turned back counter clockwise, while observing the bow pattern change on the PR 118 or and equivalent substitute factory test surface. That is, rotating the screw 22 to relax said initial relatively larger mirror curvature until the bow error has been reduced by lesser mirror curvature to an acceptable bowing range of only ±5 um to ±10 um. The amount of acceptable corrected residual bow may vary from imager to imager from ±5 um to ±10 um. The final corrected bow shape on the PR may have a slight "W" (or "M") profile within that allowable range, because the slightly deformed (curved) mirror 112 after its bow correction is not truly cylindrical and its radius varies, due to its slightly parabolic shape as corrected. The shape of the curved mirror 112 is not cylindrical here in this example 20 because the mirror 112 is being pulled only in its center. However, that "W" shape bow profile is not a concern if the imagers are for different printers, or if all of the imagers for the same printer all have a similar corrected bow signature and the above bow matching specification from imager to imager is satisfied. Also, additional such mirror deformation bow correction mechanisms can be provided using two yokes or C-clips, spaced equidistantly from the center of the mirror, if desired.

This disclosed system 20 provides a sufficiently accurate method to correct for bow at the image plane (on the PR surface) without any difficulty. This adjustment can thus be easily performed relatively non-critically in manufacturing. The components that constitute the assembly are easily fabricated (easily machined and sheet metal parts). This simple bow correction system 20 has enough range and resolution to have the capability of correcting bow within at least ±10 um. Furthermore, the bow correction can be matched from imager to imager of the same type to within at least ±5 um.

Figure 5:
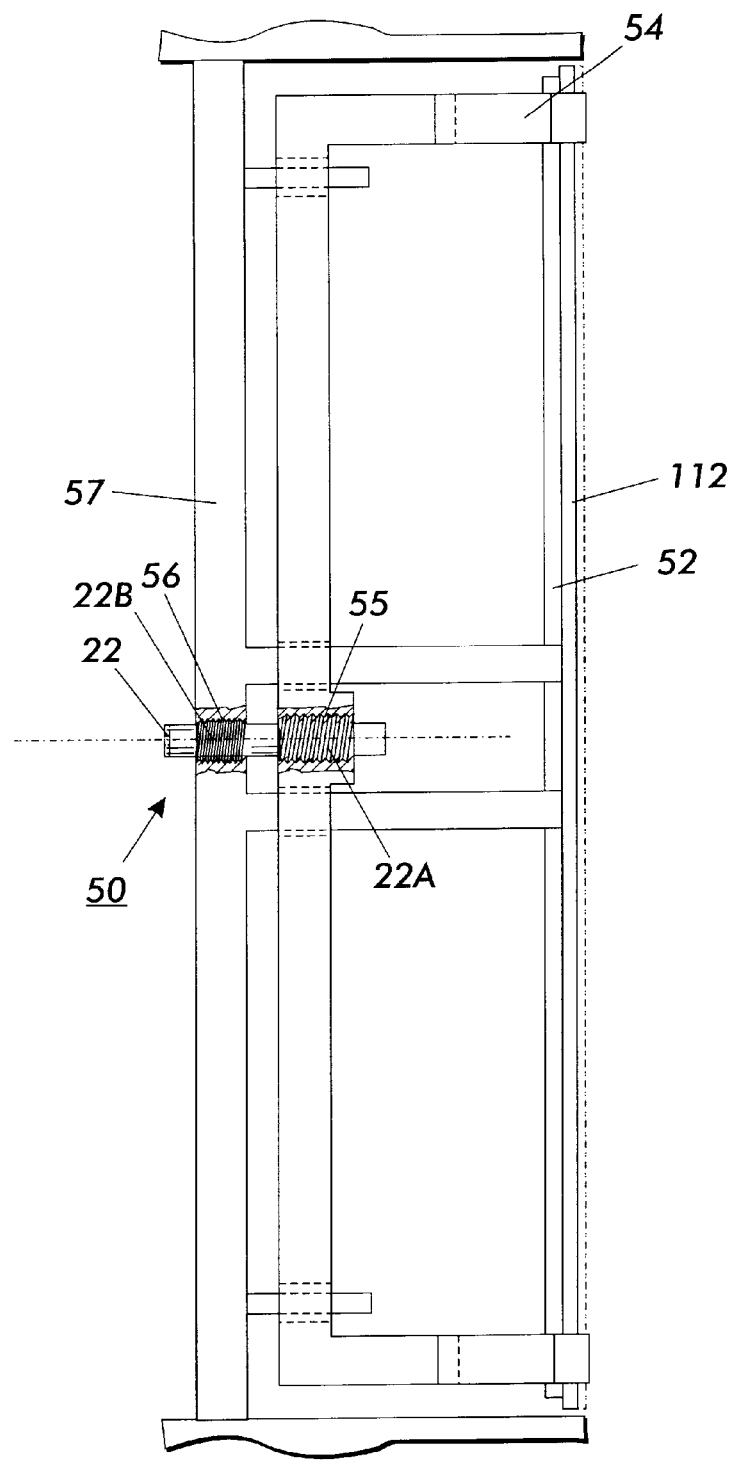
FIG. 5 is a top view, partially broken away, of a partially different exemplary embodiment of a fine mirror deformation system, shown here for orthogonal axis bowing of the same mirror.
Figure 6:
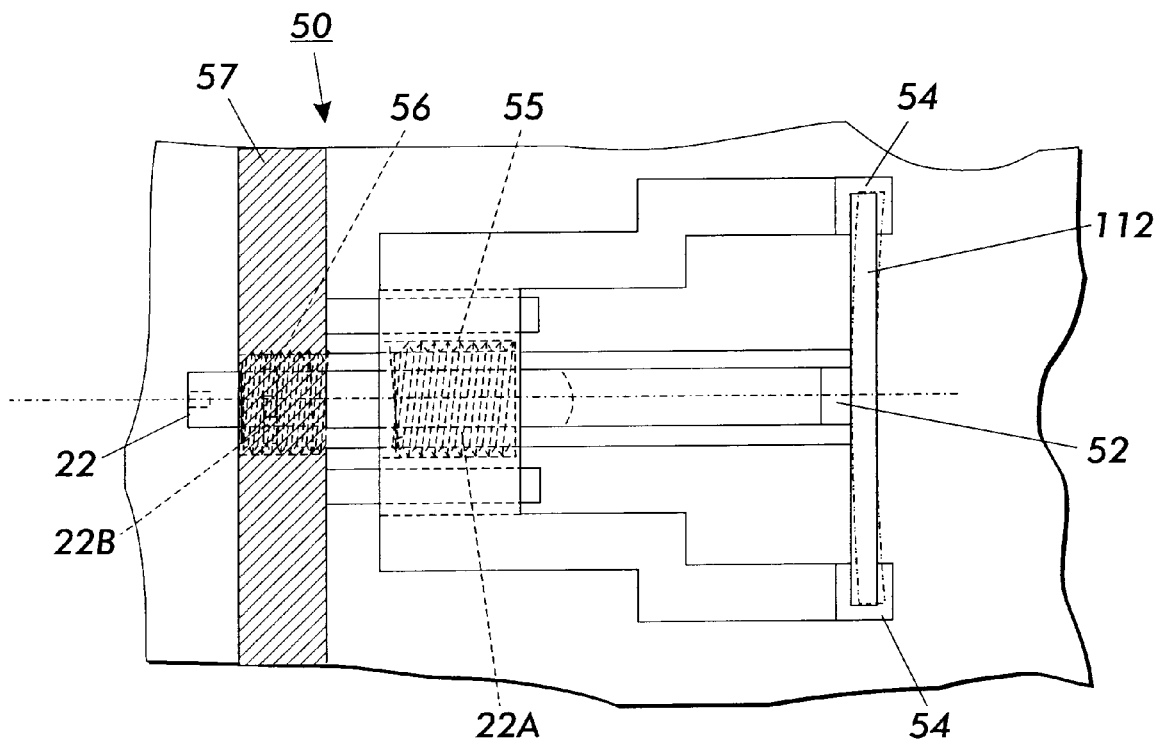
FIG. 6 is a cross-sectional end view of the exemplary mirror deformation system of FIG. 5.

FIGS. 5 and 6 show another, generally similar, mirror deflection system 50 using the same differential screw 22 for mirror 112 or other mirror deformation (bowing) on the opposite or orthogonal axis to the system 20 of FIGS. 1–4. Here, a rigid supporting frame member 52, which may be fastened to the back of the mirror glass, extends axially along the back of the mirror 112, centrally thereof, as shown. A slightly different C-clamp 54 grips the top and bottom edges of the mirror. In this example, near both ends of the mirror as well as centrally. This C-clamp 54 has a mating threaded screw hole 55 block connection to one of the two sets of screw threads 22A on the screw 22. The other screw threads 22B on the screw 22 are threaded into a mating screw hole 56 in another rigid frame member 57 (which may connect with frame member 52). Thus, rotation of the differential screw 22 pulls with the C-clamp 54 the top and bottom of the mirror 112 relative to the central axis of the mirror which is held in position by its rigid support 52, thus bowing the mirror 112 as illustrated by the exaggerated dashed lines in FIG. 6. Opposite screw 22 rotation would provide opposite direction mirror bowing.

While the embodiments disclosed herein are preferred, it will be appreciated from this teaching that various alternatives, modifications, variations or improvements therein may be made by those skilled in the art, which are intended to be encompassed by the following claims.

What is claimed is:

1. In a printer with a raster scanning system for image scanning a photoreceptor surface with scan lines, which scan lines have a small undesired non-linear bow, and which raster scanning system has an optical path with at least one mirror therein, the improvement for at least partially compensating for said bow comprising:

a bow compensation system for very slightly deforming the initial plane of said mirror in a direction to at least partially correct said bowing of said scan lines, said bowing compensation system including a frame member with a first finely threaded aperture, a mirror gripping system gripping said mirror having a second finely threaded aperture coaxial said first finely threaded aperture, and a differential screw engaging both said first and second finely threaded apertures of said frame member and said mirror gripping system, said differential screw having a single common axis screw shaft with first and second separate but coaxial fine screw thread patterns having slightly different screw pitches, one of which screw thread patterns operatively engages said second finely threaded aperture of said mirror gripping system, and the other of which screw thread patterns engages first finely threaded aperture of said frame member, so that rotation of said screw shaft moves said mirror gripping system and its engaged portion with said mirror by the difference between said slightly different screw pitches to provide a very small deformation of said mirror by a rotation of said screw shaft;

wherein said mirror has an elongated configuration with widely opposing ends and narrowly opposing sides, and wherein said frame member holds said mirror at said widely opposing ends, and wherein said mirror gripping system has a C-clamp configuration and grips said narrowly opposing sides of said mirror centrally between said widely opposing ends of said mirror.

\* \* \* \* \*